United States Patent Office 3,499,042
Patented Mar. 3, 1970

3,499,042
ETHER PRODUCTION
Edgar J. Smutny, San Francisco, Calif., assignor to Shell Oil Company, New York, N.Y., a corporation of Delaware
No Drawing. Continuation-in-part of application Ser. No. 456,000, May 14, 1965. This application Aug. 28, 1967, Ser. No. 663,559
Int. Cl. C07c 43/14
U.S. Cl. 260—614      6 Claims

ABSTRACT OF THE DISCLOSURE

Aliphatic 2,7-alkadienyl ethers, produced by reaction of certain α,ω-conjugated alkadienes and aliphatic primary or secondary alcohols, in the presence of a platinum, palladium or ruthenium compound as catalyst and an alkoxide anion catalyst promoter.

Cross-references to related applications

This application is a continuation-in-part of copending application of Smutny Ser. No. 456,000 filed May 14, 1965 and now abandoned, and also is related to copending application of DeAcetis and Smutny, Ser. No. 456,001, filed May 14, 1965, now U.S. Patent No. 3,432,465.

BACKGROUND OF THE INVENTION

Methods are available in the art for the dimerization of conjugated dienes under conditions whereby a derivative of the diene dimer is observed. In general, such methods produce a diene dimer moiety which is branched; for example, from the dimerization of butadiene is typically obtained a methylheptadiene moiety as the principal acyclic product type. General methods of producing diene dimer derivatives wherein the diene moieties have dimerized in a linear manner have not been available.

SUMMARY OF THE INVENTION

It has now been found that an improved process of producing aliphatic 2,7-alkadienyl ethers comprises the process of reacting alcohols with certain conjugated alkadienes in the presence of certain metal compounds as catalyst and an alkoxide anion cocatalyst. Although the mechanism of the condensation process is not completely understood, the process of the invention results in the efficient production of ethers, one moiety of which is derived from the alcohol reactant and the other moiety of which may be considered as derived from a dimer of the diene reactant. By way of illustration, from reaction of ethanol and butadiene in the process of the invention is obtained 1-ethoxy-2,7-octadiene.

DESCRIPTION OF PREFERRED EMBODIMENTS

The conjugated diene employed as reactant in the process of the invention is an α,ω-conjugated alkadiene having only hydrogen substituents on the terminal carbon atoms of the four-carbon chain. Dienes that possess non-hydrogen substituents on the internal, i.e., non-terminal, carbon atoms are suitably employed, provided that the internal-carbon substituents do not unduly sterically hinder the diene dimerization. A preferred class of diene reactants comprises butadiene having from 0 to 2 internal-carbon methyl substituents. These diene reactants are butadiene, isoprene and 2,3-dimethylbutadiene. Of these, butadiene is particularly preferred.

The process of the invention is broadly applicable to the production of aliphatic ethers of a wide variety of compounds incorporating within their structure at least one alcoholic hydroxyl group, that is, a hydroxyl group attached to an aliphatic carbon atom, and the process is suitably employed with monohydric or polyhydric alcohols of complex or comparatively simple structure. Best results are obtained when an alcohol of comparatively simple structure is employed wherein there is at least one alcoholic hydroxyl group that is bonded to a carbon atom which is a member of no more than two carbon-carbon bonds, i.e., wherein there is a primary or secondary alcoholic hydroxyl group.

The preferred alcohol reactant of the present process comprises an aliphatic moiety having from 1 to 4 hydroxyl groups, preferably from 1 to 2, each of which is attached to an aliphatic carbon atom and at least one of which is attached to a primary or secondary carbon atom, that is, a carbon atom bound no more than twice, i.e., less than thrice, to other carbon atoms and is therefore non-tertiary, and additionally the alcohol reactant is free from acidic hydrogens more acidic than the alcoholic hydroxyl groups present in the reactant alcohol molecule. The alcohol reactant is an alcohol of up to 20 carbon atoms which is free of non-aromatic carbon-carbon unsaturation, that is, contains aromatic unsaturation as any carbon-carbon unsaturation present, and is wholly aliphatic or incorporates one or more aromatic moieties within the molecule. The alcohol reactant is a hydrocarbon alcohol containing only atoms of carbon and hydrogen besides the oxygen present in the hydroxyl group(s), or is a substituted-hydrocarbon alcohol with atoms of halogen, particularly up to 4 atoms of halogen of atomic number from 9 to 35, that is, fluorine, chlorine and bromine, oxygen, and nitrogen incorporated in functional groups such as oxy, keto, tertiary amino, and similar linkages.

When the alcohol reactant is wholly aliphatic and hydrocarbon, the alcohols are hydroxyalkanes, e.g., acyclic hydroxyalkanes or cyclic hydroxyalkanes, and are illustrated by monohydric alkanols such as methanol, ethanol, butanol, sec-butanol, octanol, dodecanol, 2-ethylhexanol, isobutanol and 5-octadecanol; by monohydric cycloalkanols such as cyclopentanol, cyclohexanol, 2,3,5-trimethylcyclopentanol and 1-hydroxydecalin; and by polyhydric acyclic hydroxyalkanes such as ethylene glycol, propylene glycol, glycerol, trimethylene glycol, 1,2,6-hexanetriol, 2-methylpenta-2,4-diol, pentaerythritol and 1,4,8,12-dodecatetraol; as well as polyhydric cyclic hydroxyalkanes such as 1,3-cyclohexandiol, 1,3-dihydroxy-1-ethylcyclopentane, 1,4 - dihydroxydecalin, 1,4-bis(hydroxymethyl)cyclohexane and 1,4,6-trihydroxydecalin.

The alcohol reactant suitably has aromatic moieties present within the molecule provided that all hydroxyl groups are substituents of the aliphatic carbon atom portions of the molecule. Illustrative of such hydroxy aralkanes are monohydric alcohols such as benzyl alcohol, 1-hydroxytetralin, β-phenylethanol, 2-(p-tolyl)-1-propanol, and β,β-diphenyl-1-butanol; as well as polyhydric alcohols including 2-phenylpropa-1,3-diol, 1-(hydroxymethyl)naphthalene, 4,4' - (2 - hydroxyethyl)-biphenyl, phenylethylene glycol, 1,3-bis(1,2-dihydroxyethyl)-benzene and 3,3-diphenylpropa-1,2-diol.

As previously stated, the alcohol reactant is also suitably a substituted-hydrocarbon alcohol containing halogen, oxygen, and tertiary nitrogen in a variety of functional groups. Illustrative of such substituted-hydrocarbon alcohols are diethylene glycol, tetraethylene glycol, 2-methoxytrimethylene glycol, the Cellosolve and the Carbitols, e.g., 2-ethoxyethanol and diethyleneglycol monobutyl ether, 2-chloroethanol, 2,2-dibromopropanol, perfluoro-2-butanol, 2-hydroxethyl acetate, 6-methoxyhexa-1,2-diol, 3-(4-dimethylaminophenyl)-1-propanol, 1-acetoxy-4-pentanol, 2-methoxy-2-methyl-4-pentanol, 1-(4-hydroxymethylphenyl) - 2 - (4-chloromethylphenyl) - 2-propanol and the like.

In general, alcohols having only saturated carbon-carbon linkages, i.e., carbon-carbon single bonds, are preferred over analogous alcohols incorporating aromatic moieties, and hydrocarbon alcohols are preferred over substituted hydrocarbon materials; particulraly preferred are those hydrocarbon alcohols of up to 12 carbon atoms and from 1 to 2 hydroxyl substituents. As a class, primary alcohols provide better results than analogous secondary alcohols, and most preferred are lower alkyl monohydric primary alcohols, i.e., primary alkanols, of up to 4 carbon atoms.

The optimum ratio of alcohol reactant to conjugated diene will depend in part upon the functionality of the alcohol, that is, the number of primary or secondary hydroxyl alcoholic groups present in the alcohol reactant molecule, as well as the extent of reactant conversion that is desired. Ratios of moles of alkadiene to moles of non-tertiary alcoholic hydroxyl groups, i.e., primary or secondary hydroxyl group, as low as about 1:10 are suitable if only low or partial conversion is employed. However, to obtain higher conversions, a larger proportion of the diene is preferred and ratios of moles of diene to moles of non-tertiary alcoholic hydroxyl group from about 1:8 to about 8:1 are more satisfactory, with best results being obtained when ratios of moles of diene to moles of non-tertiary alcoholic hydroxyl group from about 1:4 to about 2:1 are utilized. It is within the contemplated scope of the invention to react, on occasion, only part of the alcoholic hydroxyl groups present in the reactant molecule. For example, when a dihydric alcohol reactant is employed, one or alternatively both hydroxyl groups are etherified. In the modification wherein the etherification of only part of the hydroxyl groups present is effected, such restrictive etherification is favored by reactant ratios employing an excess of the alcohol reactant.

The catalyst employed in the process of the invention is a metal compound wherein the metal is selected from palladium, platinum and ruthenium. Particularly preferred as catalyst is a compound of a Group VIII C metal having an atomic number from 46 to 78 inclusive, i.e., palladium and platinum, and most preferred as catalyst is a compound of palladium. Without wishing to be bound by any particular theory, it appears that the chemical transformations during the course of the reaction which involve the metal compound are quite complex, probably involving the formation and destruction of complexes between the metal moiety and the diene reactant and/or the presumed diene dimer intermediate. Metal compounds that are soluble in the reaction medium as well as compounds that are superficially insoluble in the reaction system are operable, in the latter case apparently through dissolved metal moieties, the formation of which is probably influenced by interaction with the diene reactant and/or the alcohol reactant and the solubilization resulting therefrom. To obtain optimum reaction rates, the metallic compound is preferably soluble in the reaction mixture or serves as a precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium, platinum and ruthenium salts of organic or inorganic acids which are weak or strong acids are suitable. When the metal-containing catalyst is provided as a salt, best results are obtained through utilization of a metal halide, e.g., platinum chloride, platinum bromide, palladium chloride, palladium iodide, ruthenium chloride, ruthenium bromide and the like, and particularly suitable results are obtained when metal chlorides are employed. Also suitable are salts wherein the metal is present in the anion, as for example in the case of platinum, the use of a chloroplatinite is satisfactory, particularly an alkali metal platinite, e.g., sodium chloroplatinite.

In an alternate modification of the process of the invention, the catalyst is provided in the form of a metal complex. Employing palladium for purposes of illustration, one type of suitable complex is a complex of a palladium salt and organic ligand, such as is represented by the formula $L_2PdX_2$ wherein X is halogen, preferably chlorine, and L is a tertiary nitrogen-containing ligand complexed with the palladium through the nitrogen moiety thereof. Illustrative of such L groups are nitriles, both aromatic and aliphatic, such as benzonitrile, propionitrile, acetonitrile, toluonitrile and the like; heterocyclic nitrogen compounds such as pyridine, quinoline, isoquinoline, picoline and lutidine; and tertiary aliphatic amines such as triethylamine, tributylamine and dimethylhexylamine.

An equally suitable type of palladium complex is a π-allyl complex of palladium. The simplest member of this class is a π-allyl palladium salt which, when the anion is chlorine, is represented by the following formula:

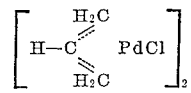

The preparation of this complex and related complexes is described by Huttel et al., Angew. Chemie, 71, 456 (1959). Other illustrative π-allyl complexes are represented by the formula

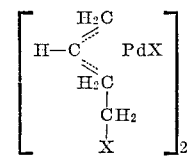

wherein X is halogen, which complexes are conveniently prepared by the reaction of diene, e.g., butadiene or isoprene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and ruthenium are also suitable as catalysts in the process of the invention, although as previously stated, palladium-containing catalysts are generally to be preferred.

In an additional modification of the process of the invention, the metal-containing catalyst is provided in the form of a commercial supported elemental metal catalyst. Although the apparent oxidation state of the metal in such supported catalysts is zero, which elemental metal is not soluble in the reaction mixture and therefore does not act directly as a catalyst, sufficient metallic species of ionic character are present as impurities in the commercial "metal (O)" catalysts so as to enable such a catalyst to be employed as a source of metal compound.

It is considered that in each above case the palladium or platinum is added as a palladium (II) or platinum (II) compound and the ruthenium is added as a ruthenium (III) compound, which compounds serve as catalyst or catalyst precursor in the process of the invention. Largely for reasons of convenience and economy, the preferred metal-containing catalyst is palladium chloride.

The process of the invention is characterized by the requirement for only catalytic quantities of platinum, palladium or ruthenium compound. Although utilization of larger amounts of metal-containing catalyst is not detrimental to the process of the invention, amounts larger than about 1% based upon total reactants are not generally required. Amounts of metal compound less than about 0.001% mole on the same basis are generally unsuitable because of the inevitable physical loss of catalyst during reaction and processing. In general, amounts of catalyst from about 0.01% mole to about 0.5% mole based upon total reactants are satisfactory and are preferred.

Although in certain applications the metal compound alone serves as an effective catalyst, the activity of the metal compound is greatly enhanced by the presence within the reaction mixture of an alkoxide anion catalyst promoter. By the term "alkoxide anion" as employed herein is meant the anion illustratively obtained by removal of at least one hydrogen moiety of at least one alcoholic hydroxyl group of an alcohol reactant as defined above. It is not required that the alkoxide anion employed as catalyst promoter correspond to the alcohol reactant undergoing reaction, and when the structure of the alcohol reactant undergoing reaction is relatively complex, it may be preferable to employ a simpler alkoxide anion as the catalyst promoter. For example, when 1,3,5-tris(hydroxymethyl)benzene is reacted with conjugated diene in the process of the invention, any of the alkoxide anions derived from the trihydric alcohol reactant is suitably employed as the catalyst promoter, although alternatively the methoxide anion, i.e., the anion produced by removal of the hydroxylic hydrogen of methanol, is also suitably employed to promote the catalyst activity. As stated above, when a polyhydric alcohol is utilized, any alkoxide anion derivable therefrom is suitable. When employing a dihydric alcohol, for example, either the corresponding mono-anion or the corresponding di-anion is suitably utilized to promote catalyst activity, as well as alkoxide anions of less complex structure. Of course, alkoxide anions of more complex structure are also suitable.

The presence of alkoxide anion in the reaction system may be brought about by any convenient method. In one modification of the process of the invention, the alkoxide anion is prepared in situ by the addition to the reaction mixture of a soluble base which is preferably more basic than the alkoxide anion. Reaction of added base with the alcohol reactant results in the formation of the corresponding alkoxide anion through a process of neutralization. Exemplary bases employed in an in situ formation of alkoxide anion are organic bases, particularly nitrogen-containing bases such as ammonia and tertiary amines such as trimethylamine, triethylamine, pyridine and quinoline; as well as bases containing a phenoxide anion, particularly alkali metal salts of phenols, e.g., sodium phenoxide, sodium p-chlorophenoxide or potassium salts of any of the isomeric cresols. In the preferred modification of the process of the invention, the alkoxide anion is added as a preformed material, customarily in the form of a soluble metal salt of a suitable alcohol, e.g., either the salt of the alcohol undergoing reaction or the salt of a comparable alcohol of less complex structure. Suitable metal salts of alcohols include alkali metal alkoxides, particularly sodium alkoxides, which are conveniently prepared by reaction of a suitable alcohol with alkali metal either in situ or separately from the reaction system.

The role of the alkoxide anion in the process of the invention is not known with certainty. Without wishing to be bound by any particular theory, it appears probable that the alkoxide anion serves as a metal-bound ligand in metal-diene complexes which are possible intermediate species in the formation of the aliphatic alkadienyl ethers of the invention. The alkoxide anion is desirably present in molar amounts that are equal to or greater than the molar amount of the metal-containing catalyst compound. Molar ratios of alkoxide anion to metal compound from about 1:1 to about 8:1 are satisfactory, although molar ratios from about 1:1 to about 4:1 are preferred.

The process of the invention is typically conducted by charging the reactants, catalyst and catalyst promoter to an autoclave or similar reactor and maintaining the reaction mixture at reaction temperature until reaction is complete. The method of mixing is not critical, although it is generally preferred to mix the reactants and add the catalyst and catalyst promoter thereto. The reaction is suitably conducted throughout a wide range of reaction temperatures and pressures so long as the reactants are maintained substantially in the liquid phase. Reaction temperatures from about −20° C. to about 100° C. are suitable, although temperatures from about 0° C. to about 85° C. are preferred and satisfactory results are frequently obtained when ambient temperature is employed. Typical reaction pressures vary from about 0.5 atmosphere to about 80 atmospheres. Frequently, good results are obtained when the reaction pressure is autogenous, that is, the pressure generated when the reactants are maintained at reaction temperature in a sealed reaction vessel. Such pressures are typically from about 1 atmosphere to about 20 atmospheres.

The process of the invention is conducted in the presence or in the absence of solvent. In the modification wherein solvent is employed, solvents that are suitable are those capable of dissolving the reactants, catalyst and catalyst promoter, and are inert to the reactants and the products prepared therefrom. Exemplary solvents are ethers including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether and glycerol triethyl ether; aromatic hydrocarbons such as benzene, toluene and xylene; N,N-dialkylalkanoic acid amides such as dimethyl formamide and N,N-diethylacetamide; halogenated hydrocarbons such as chloroform, carbon tetrachloride, tetrachloroethylene, methylene chloride and bromoform; sulfoxides such as dimethyl sulfoxide; and nitriles such as acetonitrile and benzonitrile. Also suitable as solvent is an excess of the alcohol reactant if the alcohol is liquid at reaction temperature. The solvent, if any, is employed in molar excess over the amount of total reactants, and in general, moles of solvent up to about 150 moles per mole of total reactants are satisfactory. For convenience, it is generally preferred to conduct the reaction in the absence of added solvent whenever the physical characteristics of the reaction mixture, particularly the melting point, will allow.

Subsequent to reaction, the reaction mixture is seperated and the desired product recovered by conventional means such as selective extraction, fractional distillation and chromatographic techniques.

The products of the invention are aliphatic alkadienyl ethers illustratively produced by dimerization of the diene reactant and reaction of the diene dimer with the alcohol reactant to etherify at least one of the alcoholic hydroxyl groups. In terms of the alcohol reactant as previously defined, the products of the invention are aliphatic alkadienyl ethers wherein the alkadienyl moiety is 2,7-octadienyl or methyl-substituted 2,7-octadienyl depending upon the particular alkadiene employed as reactant, and the aliphatic moiety is that moiety illustratively obtained by removal of at least one hydroxyl hydrogen of a mono- to polyhydric alcohol of from 1 to 4 alcoholic hydroxyl groups and of up to 20 carbon atoms. The octadienyl moiety will have from 0 to 4 methyl substituents, depending upon the degree of methyl substitution on the diene reactant. When butadiene is employed as the diene reactant, the alkadienyl moiety will be 2,7-octadienyl. Alternatively, when the diene reactant is isoprene, the alkadienyl moiety will principally comprise 3,7-dimethyl-2,7-octadienyl and/or 3,6-dimethyl-2,7-octadienyl and when the diene reactant is 2,3-dimethyl-butadiene, the alkadienyl moiety is 2,3,6,7-tetramethyl-2,7-octadienyl. Generically these alkadienyl moieties are represented by the formula

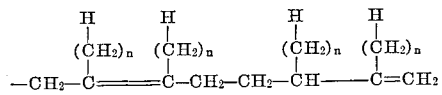

wherein $n$ independently is a whole number from 0 to 1 inclusive. It should be appreciated that it is within the contemplated scope of the invention to prepare aliphatic alkadienyl ethers of polyhydric alcohol reactants wherein only a portion of the alcoholic hydroxyl groups within the alcohol reactant is etherified. However, the preferred products of the invention are those wherein each alcoholic hydroxyl group within the alcohol reactant has been etherified with an alkadienyl moiety as previously defined.

It will be apparent that a wide variety of aliphatic alkadienyl ethers can be prepared by varying the alcohol and the diene reactants. Illustrative of these products are 1-methoxy-2,7-octadiene prepared from methanol and butadiene, 1-ethoxy-3,6-dimethyl-2,7-octadiene and 1-ethoxy-3,7-dimethyl-2,7-octadiene prepared from ethanol and isoprene, 1-butoxy-2,3,6,7-tetramethyl-2,7 - octadiene prepared from n-butanol and 2,3-dimethylbutadiene, as well as other illustrative products such as 1-(3-chloropropoxy)-2,7-octadiene, 1-(3,3 - dimethylbutoxy) - 2,7-octadiene, 1-(2-hydroxyethoxy)3,7-dimethyl - 2,7 - octadiene, 1,3-bis(2,7 - octadienyloxy)butane, bis(2,7 - octadienyloxy)methyl ether, 1 - benzyloxy-2,3,6,7-tetramethyl-2,7-octadiene, 1,2,6-tris(2,7-octadienyloxy)hexane, 1,4-bis (2,7-octadienyloxymethyl)cyclohexane, 1 - (4-hexanolyloxybutoxy)-2,7-octadiene, 1-[(3 - dimethylaminophenyl) methoxy]-3,6-dimethyl-2,7-octadiene, 1,1,1-tris[(2,7-octadienyloxy)methyl]ethane, 1 - perchloroethoxy - 3,7 - dimethyl-2,7-octadiene, tetrakis(2,7-octadienyloxymethyl)-methane and the like.

The products of the invention are useful in a variety of applications. The remaining unsaturated linkages are hydrated, as by sulfation with sulfuric acid followed by aqueous hydrolysis of the initially formed sulfate ester, to an ether-alcohol which is reacted with phthalic acid or other carboxylic acid to form ether-esters useful as plasticizers for polyvinyl chloride, polyvinyl acetal resins, polystyrene, polyvinyl halide thermoplastics and the like according to procedures disclosed in U.S. Patent Nos. 2,371,131, 2,222,490, 2,166,557 and 2,744,877. The ethylenic linkages serve as a reactive site for homopolymerization or copolymerization, e.g., titanium halide-aluminum alkyl catalyzed copolymerization with relatively larger proportions of ethylene or propylene to form thermoplastics. The ethylenic linkages are epoxidized as by treatment with peracetic or other percarboxylic acids to form the corresponding epoxy derivatives from which epoxy resins useful in castings and laminates are prepared upon curing with polycarboxylic acid anhydrides, e.g., hexahydrophthalic anhydride. The octadienyl ethers of the invention are hydrolyzed in the presence of acid catalysts to form the corresponding octadienyl alcohols from which carboxylate esters, e.g., the bis(octadienyl) phthalates, are formed by reaction with carboxylic acids, e.g., phthalic acid, which carboxylate esters are useful as plasticizers in polyvinyl chloride and related materials, by procedures disclosed, for example, in U.S. Patent No. 3,172,904. The octadienyl alcohols are also converted by conventional procedures, e.g., reaction with chlorosulfonic acid followed by neutralization with sodium hydroxide, to the corresponding sulfates which are useful as detergents in synthetic household laundry products.

To further illustrate the process of the invention and the novel products obtainable thereby, the following examples are provided. It should be understood that the details thereof are not to be regarded as limitations, as they may be varied as will be understood by one skilled in this art.

EXAMPLE I

To a glass ampoule was charged 1.75 moles of methanol, 1.3 moles of butadiene, 1 g. of palladium chloride and 2 g. of sodium methoxide. The ampoule was sealed and the reaction mixture was agitated for three days at ambient temperature. Subsequent to removal from the ampoule, the product mixture was filtered and the desired ether product separated from the mixture by fractional distillation. The methanol conversion was 25% based on methanol charged and the yield of 1-methoxy-2,7-octadiene, B.P. 50° C./2 mm., was 90% based on methanol converted. The nuclear magnetic resonance spectrum of the product was consistent with the above formula. The elemental analysis of the 1-methoxy-2,7-octadiene product was as follows:

*Analysis.*—Calcd. (percent by weight): C, 77.1; H, 11.5. Found: C, 77.6; H, 11.8.

EXAMPLE II

The procedure of Example I was repeated employing 1.75 moles of methanol, 1.27 moles of butadiene, 1 g. of palladium chloride as catalyst and 2.1 g. of sodium phenoxide as catalyst promoter. Subsequent to reaction and work-up, the conversion of methanol was determined by gas-liquid chromatographic analysis to be 10% based upon methanol charged, and the yield of 1-methoxy-2,7-octadiene based upon methanol converted was 70%.

When the reaction was repeated at 100° C., 1-methoxy-2-7-octadiene was also obtained. A good yield of 1-methoxy-2,7-octadiene is also obtained when ruthenium chloride is employed in place of the palladium chloride of the above example.

Similar results are obtained when platinum chloride is employed in place of the palladium chloride of the above example.

EXAMPLE III

By a procedure similar to that of Example II, 0.65 mole of n-butanol was contacted with 1.3 mole of butadiene in the presence of 1 g. of palladium chloride as catalyst and 0.9 g. of sodium methoxide as catalyst promoter. Gas-liquid chromatographic analysis of the product mixture indicated that the conversion of the butanol was 18% and the yield of 1-butoxy-2,7-octadiene based upon butanol converted was 65%.

When isoprene is employed as the diene reactant in place of the butadiene of the above example, the product mixture contains a good yield of 1-butoxy - dimethyl-2,7-octadienes, principally 1-butoxy-3,6-dimethyl-2,7-octadiene and 1-butoxy-3,7-dimethyl-2,7-octadiene.

EXAMPLE IV

When the procedure of Example III is employed to react ethylene glycol and butadiene in the presence of a catalytic amount of α-allyl palladium chloride and sodium methoxide, the product mixture contains a good yield of 1-(2-hydroxyethoxy)-2,7-octadiene and 1,2-bis(2,7-octadienyloxy)ethane.

EXAMPLE V

The procedure of Example III is followed employing 3-acetoxy-1-propanol and butadiene as reactants, 3-(methoxymethyl)-π-allyl palladium chloride as catalyst and sodium methoxide as catalyst promoter. A good yield of 3-acetoxy-1-(2,7-octadienyloxy)propane is obtained.

EXAMPLE VI

When the procedure of Example I is repeated employing benzyl alcohol in place of the methanol of that example and the sodium salt of benzyl alcohol as the catalyst promoter, a good yield of 1-benzyloxy-2,7-octadiene is obtained. The compound 1-benzyloxy-2,7-octadiene has been found to have a boiling point of 94–103° C. at approximately 1.5 mm. The infrared and nuclear magnetic resonance spectra of this compound were typical of such materials.

I claim as my invention:

1. The process of producing 2,7-alkadienyl ethers by contacting (a) an alcohol reactant free from non-aromatic carbon-carbon unsaturation and acidic hydrogens more acidic than the alcoholic hydroxyl groups present in the reactant molecule, of up to 20 carbon atoms and 1 to 2 alcoholic hydroxyl groups wherein at least one hydroxyl group is bonded to a carbon atom which is a member of no more than two carbon-carbon bonds, selected from the group consisting of monohydric acyclic hydroxyalkanes, polyhydric acyclic hydroxyalkanes, monohydric cyclic hydroxyalkanes, polyhydric cyclic hydroxyalkanes, and aryl substituted monohydroxy and polyhydroxy alkanes with (b) from about 0.1 mole to about 8 moles per mole of non-tertiary alcoholic hydroxyl group of said alcohol reactant of conjugated diene comprising butadiene with from 0 to 2 internal-carbon methyl substituents, in the presence of from about 0.001% mole to about 1% mole based on total reactants of a palladium halide catalyst selected from the group consisting of (1) palladium halide, (2) $\pi$-allyl palladium halide, and (3) palladium halide complex of the formula $L_2PdX_2$, wherein X is a halogen and L is a tertiary nitrogen-containing ligand selected from the group consisting of benzonitrile, propionitrile, acetonitrile, toluonitrile, pyridine, quinoline, isoquinoline, picoline, lutidine, triethylamine, tributylamine, and dimethylhexylamine, and from about 1 mole to about 8 moles per mole of said catalyst of alkali metal alkoxide catalyst promoter, said alkoxide moiety corresponding to that moiety produced by removal of at least one hydroxylic hydrogen from said alcohol reactant, in the liquid phase at a temperature from about $-20°$ C. to about $100°$ C.

2. The process of claim 1 wherein the alcohol reactant is methanol.

3. The process of claim 1 wherein the alcohol reactant is ethylene glycol.

4. The process of claim 1 wherein the alcohol reactant is one of up to 12 carbon atoms, the conjugated diene is butadiene, and the palladium halide catalyst is palladium chloride.

5. The process of claim 4 wherein the alcohol reactant is primary monohydric alkanol of up to 4 carbon atoms, the catalyst promoter is a sodium salt of said alkanol, and the temperature of said contacting is from about $0°$ C. to about $85°$ C.

6. The process of claim 5 wherein the primary monohydric alkanol is methanol.

References Cited

UNITED STATES PATENTS

| | | | |
|---|---|---|---|
| 2,982,787 | 5/1961 | Hoaglin et al. | 260—611 |
| 3,013,066 | 12/1961 | Alderson | 260—683.15 XR |
| 3,270,084 | 8/1966 | Schriesheim et al. | 260—683.2 |

FOREIGN PATENTS 560,017  2/1958  Belgium.

OTHER REFERENCES

Tsuji, Jour. Soc. Org. Syn. Chem., Japan, vol. 22, page 20, 1964.

LEON ZITVER, Primary Examiner

HOWARD T. MARS, Assistant Examiner

U.S. Cl. X.R.

252—161, 353; 260—78.4, 91.1, 80.3, 88.1, 88.3, 31.4, 31.6, 31.8, 632, 571, 491, 611, 615, 475